(12) United States Patent
Hemmelgarn et al.

(10) Patent No.: US 12,370,964 B2
(45) Date of Patent: *Jul. 29, 2025

(54) SEAT DEVICE FOR VEHICLE AND ELECTRICAL DEVICE FOR VEHICLE

(71) Applicant: TS TECH CO., LTD., Asaka (JP)

(72) Inventors: Chase Hemmelgarn, Columbus, OH (US); Steven Johnson, Newark, OH (US)

(73) Assignee: TS TECH CO., LTD., Asaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/625,451

(22) Filed: Apr. 3, 2024

(65) Prior Publication Data

US 2024/0246500 A1 Jul. 25, 2024

Related U.S. Application Data

(60) Continuation of application No. 17/867,157, filed on Jul. 18, 2022, now Pat. No. 11,975,666, which is a division of application No. 16/816,513, filed on Mar. 12, 2020, now Pat. No. 11,643,032.

(60) Provisional application No. 62/819,140, filed on Mar. 15, 2019.

(51) Int. Cl.
| | |
|---|---|
| *B60R 16/03* | (2006.01) |
| *B60N 2/06* | (2006.01) |
| *B60N 2/30* | (2006.01) |
| *B60N 2/56* | (2006.01) |
| *B60R 16/037* | (2006.01) |
| *H02J 50/12* | (2016.01) |

(52) U.S. Cl.
CPC ............... *B60R 16/03* (2013.01); *B60N 2/06* (2013.01); *B60N 2/3097* (2013.01); *B60N 2/5685* (2013.01); *B60R 16/037* (2013.01); *H02J 50/12* (2016.02)

(58) Field of Classification Search
None
See application file for complete search history.

(56) References Cited

U.S. PATENT DOCUMENTS

| | | | |
|---|---|---|---|
| 5,696,409 A | 12/1997 | Handman et al. | |
| 6,010,195 A | 1/2000 | Masters et al. | |
| 6,059,345 A * | 5/2000 | Yokota | B60N 2/06 |
| | | | 297/331 |
| 6,279,981 B1 | 8/2001 | Mesnage | |
| 7,520,554 B2 | 4/2009 | Brown et al. | |
| 7,665,642 B2 | 2/2010 | Abbate | |

(Continued)

FOREIGN PATENT DOCUMENTS

EP 2733012 A1 5/2014

*Primary Examiner* — Joseph D. Pape
(74) *Attorney, Agent, or Firm* — Armstrong Teasdale LLP

(57) ABSTRACT

A seat device for a vehicle includes: a support member detachably attached to a floor of the vehicle; an occupant seat movably supported by the support member and provided with an electrical component; and a wireless power supply mechanism configured to supply electric power to the electrical component. The wireless power supply mechanism includes a power transmitting unit attached to the floor, and a power receiving unit attached to the support member so as to face the power transmitting unit and configured to receive the electric power wirelessly from the power transmitting unit.

16 Claims, 14 Drawing Sheets

(56) References Cited

U.S. PATENT DOCUMENTS

| | | | |
|---|---|---|---|
| 9,718,378 B2 * | 8/2017 | Schulz | B60N 2/0244 |
| 10,232,748 B2 * | 3/2019 | Akaike | B60N 2/565 |
| 10,468,914 B2 | 11/2019 | Lee et al. | |
| 10,848,008 B2 | 11/2020 | Cho et al. | |
| 11,027,680 B2 | 6/2021 | Line et al. | |
| 2012/0112534 A1 | 5/2012 | Kesler et al. | |
| 2012/0248887 A1 | 10/2012 | Kesler et al. | |
| 2014/0252813 A1 | 9/2014 | Lee et al. | |
| 2014/0265555 A1 | 9/2014 | Hall et al. | |
| 2017/0120757 A1 | 5/2017 | Lewis | |
| 2020/0223378 A1 | 7/2020 | Mushiake | |
| 2020/0343766 A1 | 10/2020 | Tanaka et al. | |

* cited by examiner

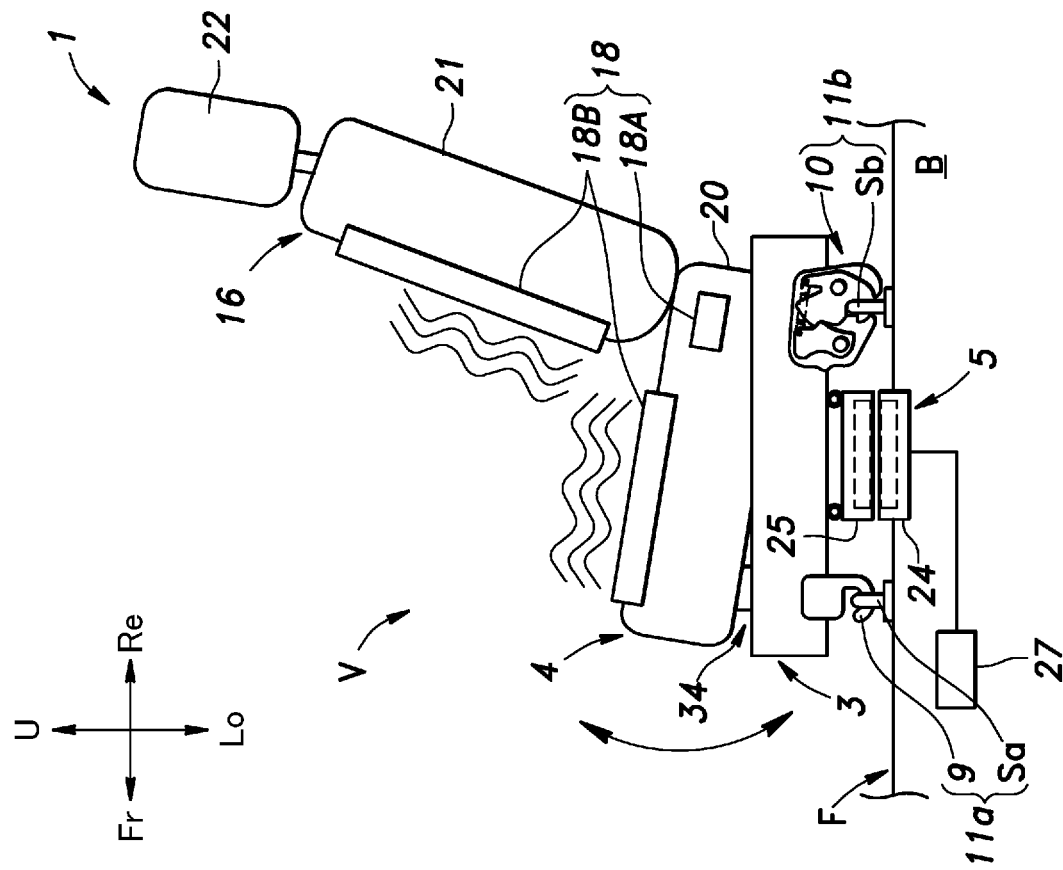
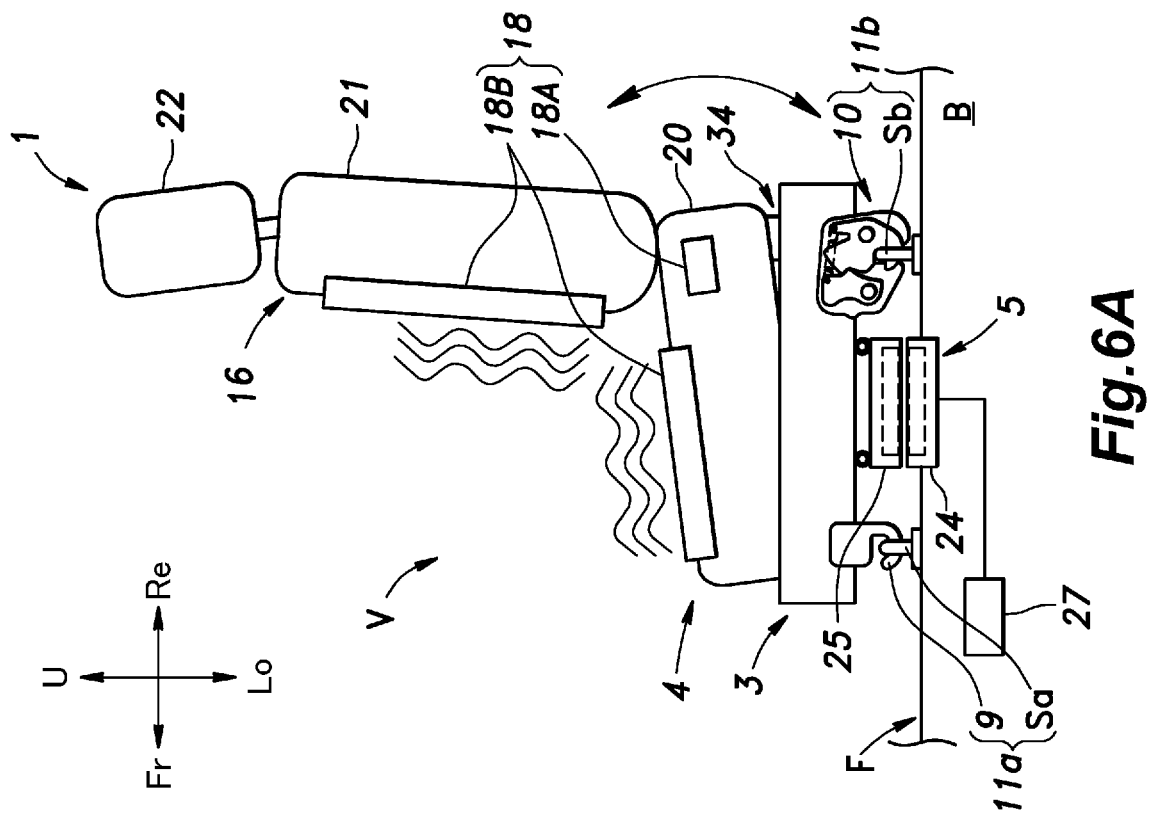

SEAT DEVICE FOR VEHICLE AND ELECTRICAL DEVICE FOR VEHICLE

CROSS-REFERENCE TO RELATED APPLICATION

This application is a continuation of U.S. patent application Ser. No. 17/867,157 filed on Jul. 18, 2022, which is a divisional application of U.S. patent application Ser. No. 16/816,513 filed Mar. 12, 2020, now issued as U.S. Pat. No. 11,643,032 on May 9, 2023, which claims the benefit of U.S. provisional Patent Application Ser. No. 62/819,140 filed on Mar. 15, 2019, the disclosures of which are hereby incorporated herein by reference in their entirety.

TECHNICAL FIELD

The present invention relates to a seat device for a vehicle and an electrical device for a vehicle.

BACKGROUND ART

A known seat device for a vehicle supplies electric power to an electrical component of an occupant seat by a wireless power supply mechanism. For example, U.S. Pat. No. 10,468,914B2 discloses a wireless power supply mechanism configured to wirelessly transmit electric power from a power transmitting unit provided on a floor of a vehicle to a power receiving unit provided in an occupant seat.

Conventionally, in a case where electric power is supplied to an electrical component of an occupant seat that is detachable from a floor of a vehicle, a floor harness connected to a power supply device of the vehicle and a wire harness connected to the electrical component of the occupant seat are connected directly. Accordingly, a user needs to connect the floor harness and the wire harness when attaching the occupant seat to the floor, and to disconnect the floor harness and the wire harness when detaching the occupant seat from the floor. That is, the occupant seat provided with the electrical component could not be easily attached to and detached from the floor of the vehicle.

On the other hand, conventionally, in a case where electric power is supplied to the electrical component of the occupant seat by a wireless power supply mechanism, the power receiving unit is provided in the occupant seat as disclosed in the above document. Accordingly, as the occupant seat moves with respect to the floor of the vehicle, the power receiving unit also moves with respect to the floor of the vehicle. When the power receiving unit moves with respect to the floor of the vehicle in this way, the relative positional relationship between the power transmitting unit and the power receiving unit may be changed, and such a change may affect the transmission of electric power from the power transmitting unit to the power receiving unit.

SUMMARY OF THE INVENTION

In view of such a problem of the prior art, a primary object of the present invention is to provide a seat device for a vehicle that can easily attach and detach an occupant seat provided with an electrical component and can move the occupant seat without affecting the transmission of electric power from the power transmitting unit to the power receiving unit.

To achieve such an object, one embodiment of the present invention provides a seat device (1, 41) for a vehicle that includes: a support member (3) detachably attached to a floor (F) of the vehicle (V); an occupant seat (4) movably supported by the support member and provided with an electrical component (18); and a wireless power supply mechanism (5) configured to supply electric power to the electrical component and including a power transmitting unit (24) attached to the floor, and a power receiving unit (25) attached to the support member so as to face the power transmitting unit and configured to receive the electric power wirelessly from the power transmitting unit.

According to this arrangement, it is possible to supply the electric power to the electrical component of the occupant seat without directly connecting a floor harness connected to a power supply device of the vehicle and a wire harness connected to the electrical component of the occupant seat. Therefore, it is not necessary to connect the floor harness and the wire harness after attaching the occupant seat to the floor together with the support member and to disconnect the floor harness and the wire harness before detaching the occupant seat from the floor together with the support member. That is, the occupant seat provided with the electrical component can be easily attached to and detached from the floor.

Further, the power receiving unit is not attached to the occupant seat, but attached to the support member that movably supports the occupant seat. Therefore, even if the occupant seat moves with respect to the floor, the power receiving unit remains at a fixed position with respect to the power transmitting unit. Therefore, even if the occupant seat moves with respect to the floor, the electric power can be reliably transmitted from the power transmitting unit to the power receiving unit.

Preferably, the support member is attached to the floor via at least one attachment member (Sa, Sb) protruding from a surface of the floor, and an upper surface of the power transmitting unit is located lower than an upper surface of the at least one attachment member.

According to this arrangement, when a user such as an occupant loads baggage into the vehicle in a state where the occupant seat and the support member are detached from the floor of the vehicle, the baggage can be prevented from being caught on the power transmitting unit. Therefore, the baggage and the power transmitting unit can be prevented from being damaged.

Preferably, an upper surface of the power transmitting unit is located lower than a surface of the floor.

According to this arrangement, when a user such as an occupant loads baggage into the vehicle in a state where the occupant seat and the support member are detached from the floor of the vehicle, the baggage can be prevented from being caught on the power transmitting unit. Therefore, the baggage and the power transmitting unit can be prevented from being damaged.

Preferably, the power transmitting unit and the power receiving unit are configured such that a relative positional relationship therebetween does not change even when the occupant seat moves.

According to this arrangement, even if the occupant seat moves with respect to the floor, the electric power can be reliably transmitted from the power transmitting unit to the power receiving unit.

Preferably, the support member includes a pair of left and right lower rails (7), and the occupant seat includes a pair of left and right upper rails (17) slidably engaged with the pair of left and right lower rails.

According to this arrangement, it is possible to slide the occupant seat with a simple configuration.

Preferably, the support member further includes a cross member (8) extending between the pair of left and right lower rails, and the power receiving unit is attached to the cross member.

According to this arrangement, it is possible to dispose the power receiving unit right below the occupant seat and to protect the power receiving unit by the occupant seat. Therefore, the power receiving unit can be prevented from being damaged.

Preferably, the support member is attached to the floor via a pair of front and rear attachment members (Sa, Sb), and in a side view of the vehicle, the power transmitting unit is located between the pair of front and rear attachment members.

According to this arrangement, it is possible to dispose the power transmitting unit at a position where the power transmitting unit is covered by the support member and to protect the power transmitting unit by the support member. Therefore, the power transmitting unit can be prevented from being damaged.

Preferably, the power transmitting unit and the floor are connected via a member (43) having higher thermal conductivity than the power transmitting unit.

According to this arrangement, the heat of the power transmitting unit can be released to the floor via the member having higher thermal conductivity than the power transmitting unit. Thereby, the floor can be used as a heat sink of the power transmitting unit, and the temperature of the power transmitting unit can be prevented from rising.

Preferably, the power receiving unit and the support member are connected via a member (44) having higher thermal conductivity than the power receiving unit.

According to this arrangement, the heat of the power receiving unit can be released to the support member via the member having higher thermal conductivity than the power receiving unit. Thereby, the support member can be used as a heat sink of the power receiving unit, and the temperature of the power receiving unit can be prevented from rising.

To achieve the above object, another embodiment of the present invention provides an electrical device (51) for a vehicle that includes a support member (3) detachably attached to a floor (F) of the vehicle (V); an electrical equipment (52) movably supported by the support member; and a wireless power supply mechanism (5) configured to supply electric power to the electrical equipment and including a power transmitting unit (24) attached to the floor, and a power receiving unit (25) attached to the support member so as to face the power transmitting unit and configured to receive the electric power wirelessly from the power transmitting unit.

According to this arrangement, it is possible to supply the electric power to the electrical equipment without directly connecting a floor harness connected to a power supply device of the vehicle and a wire harness connected to the electrical equipment. Therefore, it is not necessary to connect the floor harness and the wire harness after attaching the electrical equipment to the floor together with the support member and to disconnect the floor harness and the wire harness before detaching the electrical equipment from the floor together with the support member. That is, the electrical equipment can be easily attached to and detached from the floor.

Further, the power receiving unit is not attached to the electrical equipment, but attached to the support member that movably supports the electrical equipment. Therefore, even if the electrical equipment moves with respect to the floor, the power receiving unit remains at a fixed position with respect to the power transmitting unit. Therefore, even if the electrical equipment moves with respect to the floor, the electric power can be reliably transmitted from the power transmitting unit to the power receiving unit.

BRIEF DESCRIPTION OF THE DRAWINGS

FIG. 6A is a side view showing a second modification of the seat device for the vehicle according to the first embodiment of the present invention;

FIG. 6B is a side view showing a second modification of the seat device for the vehicle according to the first embodiment of the present invention;

DESCRIPTION OF THE PREFERRED EMBODIMENT(S)

First Embodiment

In the following, a seat device 1 for a vehicle V (hereinafter simply referred to as "seat device 1") according to a first embodiment of the present invention will be described with reference to FIGS. 1 to 8. Arrows Fr, Re, L, R, U, and Lo, which are appropriately attached to the drawings, indicate the front side, rear side, left side, right side, upper side, and lower side of the seat device 1, respectively.

(Configuration of the Seat Device 1)

Figure 1:
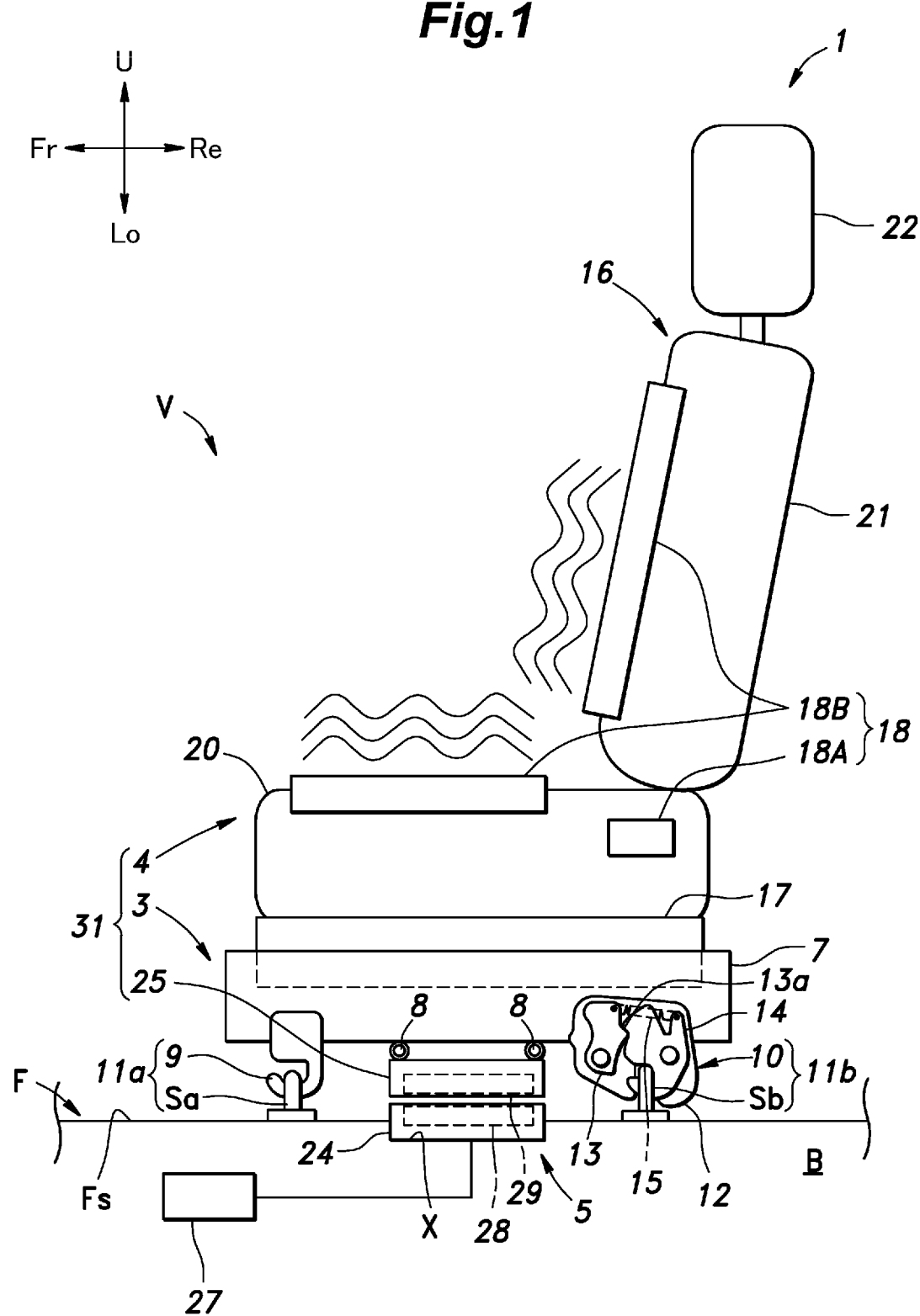
FIG. 1 is a side view showing a seat device for a vehicle according to a first embodiment of the present invention.

As shown in FIG. 1, the seat device 1 is installed on a floor F of the vehicle V such as an automobile. From a surface Fs of the floor F, a pair of left and right front strikers Sa and a pair of left and right rear strikers Sb (an example of a pair of front and rear attachment members) protrude at an interval in the fore and aft direction. Each striker Sa, Sb has a U-shape. On the surface Fs of the floor F, a recess X is provided between each front striker Sa and each rear striker Sb in a side view of the vehicle V.

Figure 2:
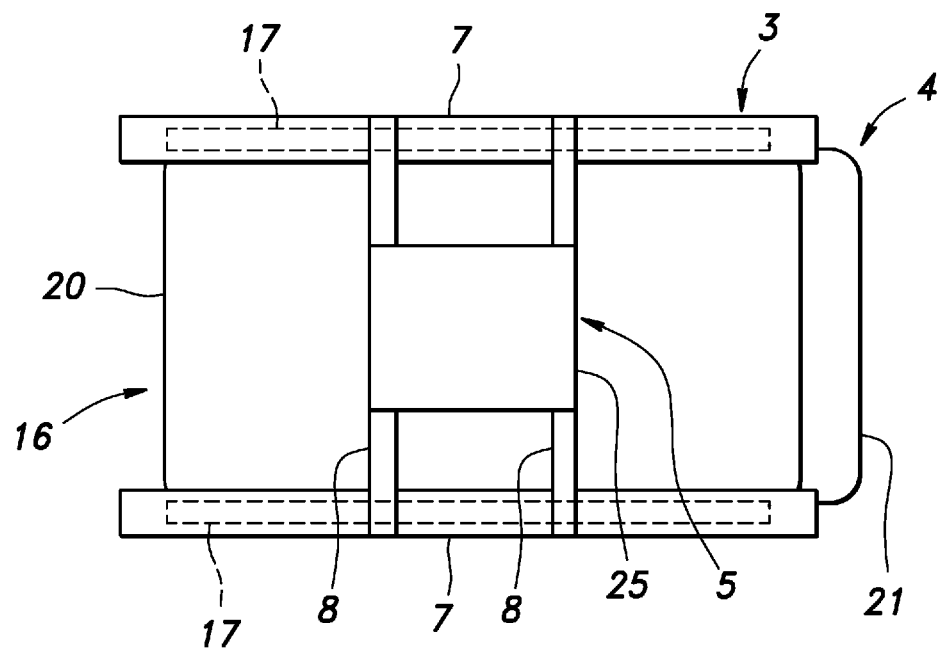
FIG. 2 is a bottom view showing a support member, an occupant seat, and a power receiving unit in the seat device for the vehicle according to the first embodiment of the present invention.

As shown in FIGS. 1 and 2, the seat device 1 includes a support member 3 detachably attached to the floor F via each striker Sa and Sb, an occupant seat 4 movably supported by the support member 3 and provided with electrical components 18, and a wireless power supply mechanism 5 configured to supply electric power to the electrical components 18. Hereinafter, each component of the seat device 1 will be described in order.

The support member 3 includes a pair of left and right lower rails 7, a pair of front and rear cross members 8 extending between the pair of left and right lower rails 7, a pair of left and right hooks 9 fixed to front parts of the pair of left and right lower rails 7, and a pair of left and right lock mechanisms 10 attached to rear parts of the pair of left and right lower rails 7. In FIG. 2, each hook 9 and each lock mechanism 10 are not shown.

Each lower rail 7 of the support member 3 consists of a metal frame and extends in the fore and aft direction. Each lower rail 7 is provided with an engagement groove (not shown) along the fore and aft direction.

Each cross member 8 of the support member 3 consists of a metal tube and extends in the lateral direction. In other embodiments, each cross member 8 may consist of a member (for example, a metal plate) other than the metal tube.

Each hook 9 of the support member 3 has a U-shape. Each hook 9 is configured to engage with each front striker Sa, and constitutes a front attachment/detachment mechanism 11a together with each front striker Sa.

Each lock mechanism 10 of the support member 3 is configured to engage with each rear striker Sb, and constitutes a rear attachment/detachment mechanism 11b together with each rear striker Sb. Each lock mechanism 10 includes a base plate 12, a lock plate 13 rotatably attached to a front part of the base plate 12, a hook plate 14 rotatably attached to a rear part of the base plate 12, and a biasing member 15 interposed between the lock plate 13 and the hook plate 14. On a rear surface of the lock plate 13, a lock groove 13a is provided. The hook plate 14 is configured to rotate between a lock position (see FIG. 1) and an unlock position (see FIG. 3). The lock position is a position where the release of the engagement of the hook plate 14 and each rear striker Sb is restricted. The unlock position is a position where the release of the engagement of the hook plate 14 and each rear striker Sb is permitted. The biasing member 15 is configured to bias the hook plate 14 to the unlock position.

As shown in FIGS. 1 and 2, the occupant seat 4 includes a seat body 16, a pair of left and right upper rails 17 attached to the seat body 16, and the electrical components 18 attached to the seat body 16. In other embodiments, the occupant seat 4 may include only one electrical component 18.

The seat body 16 of the occupant seat 4 includes a seat cushion 20 on which an occupant (not shown) sits, a seat back 21 extending upward from a rear end of the seat cushion 20, and a headrest 22 extending upward from an upper end of the seat back 21. The seat cushion 20 includes a pair of side frames (not shown).

Each upper rail 17 of the occupant seat 4 extends in the fore and aft direction. Each upper rail 17 is attached to each side frame (not shown) of the seat cushion 20. A lower part of each upper rail 17 engages with the engagement groove (not shown) of each lower rail 7 of the support member 3. Thus, the support member 3 supports the occupant seat 4 slidably in the fore and aft direction.

The electrical components 18 of the occupant seat 4 include, for example, an adjustment motor 18A for driving a slide mechanism (not shown) that slides the occupant seat 4 in the fore and aft direction, a plurality of heaters 18B for heating the seat body 16, a blower (hereinafter referred to as "AVS blower") for AVS (Air Ventilation System), seat belt reminder, a biometric sensor, and an actuator for deploying an airbag. In FIG. 1, the adjustment motor 18A and the heaters 18B are shown as examples of the electrical components 18. The heaters 18B are attached to, for example, an upper surface of the seat cushion 20 and a front surface of the seat back 21, respectively.

The wireless power supply mechanism 5 includes a power transmitting unit 24 attached to the floor F and a power receiving unit 25 attached to the support member 3 so as to face the power transmitting unit 24 and configured to receive the electric power wirelessly from the power transmitting unit 24.

The power transmitting unit 24 of the wireless power supply mechanism 5 is connected to a power supply device 27 of the vehicle V via a floor harness (not shown). The power transmitting unit 24 includes a power transmitting coil 28 for generating a magnetic field. The power transmitting unit 24 may include a capacitor or a battery (not shown) in addition to the power transmitting coil 28. A lower part of the power transmitting unit 24 is arranged in the recess X provided on the surface Fs of the floor F. An upper part of the power transmitting unit 24 protrudes upward from the surface Fs of the floor F. The power transmitting unit 24 is thermally combined with a vehicle body B including the floor F, and the vehicle body B functions as a heat sink of the power transmitting unit 24.

An upper surface of the power transmitting unit 24 does not extend to an upper surface (upper end) of each striker Sa, Sb, and is located lower than the upper surface (upper end) of each striker Sa, Sb. In the side view of the vehicle V, the power transmitting unit 24 is located between each front striker Sa and each rear striker Sb.

The power receiving unit 25 of the wireless power supply mechanism 5 is connected to the electrical components 18 via a plurality of wire harnesses (not shown). The power receiving unit 25 includes a power receiving coil 29 facing the power transmitting coil 28. The power receiving unit 25 is disposed right above the power transmitting unit 24. A vertical interval between an upper surface of the power transmitting unit 24 and a lower surface of the power receiving unit 25 is, for example, in the range of 15 mm to 25 mm. In other embodiments, the above interval may be smaller than 15 mm or larger than 25 mm.

The power receiving unit 25 is attached to each cross member 8 of the support member 3 from below. The power receiving unit 25 is thermally combined with the support member 3, and the support member 3 functions as a heat sink of the power receiving unit 25. In the side view of the vehicle V, the power receiving unit 25 is located between each hook 9 and each lock mechanism 10.

(A Method for Supplying the Electric Power to the Electrical Components 18)

When the electric power is supplied to the power transmitting unit 24 from the power supply device 27 of the vehicle V, the power transmitting coil 28 of the power transmitting unit 24 generates a magnetic field. Accordingly, the power receiving coil 29 of the power receiving unit 25 generates the electric power by the action of the magnetic field generated by the power transmitting coil 28. That is, the power transmitting unit 24 wirelessly transmits the electric power to the power receiving unit 25. The power receiving unit 25 supplies the electric power generated by the power receiving coil 29 to the electrical components 18 via the wire harnesses (not shown). In a case where the electrical components 18 include the AVS blower, the power receiving unit 25 may supply not only the electric power but also a PWM signal to the AVS blower.

In a case where the power transmitting unit 24 includes the capacitor or the battery (not shown), when the electric power is supplied to the electrical components 18, an in-rush current may be controlled by using the capacitor or the battery. Specifically, it is difficult for the power transmitting unit 24 to immediately transmit a certain amount of the electric power requested by the power receiving unit 25 to start the actuation of the adjustment motor 18A or to apply a lock current to the adjustment motor 18A. Therefore, additional electric power may be transmitted from the power transmitting unit 24 to the power receiving unit 25 by using the capacitor or the battery while transient surges of the electric power are required.

As described above, in the present embodiment, the electric power is transmitted from the power transmitting unit 24 to the power receiving unit 25 by an electromagnetic induction method that uses the action of the magnetic field. On the other hand, in other embodiments, the electric power may be transmitted from the power transmitting unit 24 to the power receiving unit 25 by a method other than the electromagnetic induction method (for example, an electric field coupling method or a resonance coupling method).

(A Method for Attaching/Detaching a Seat Unit 31 To/From the Floor F)

Figure 3:
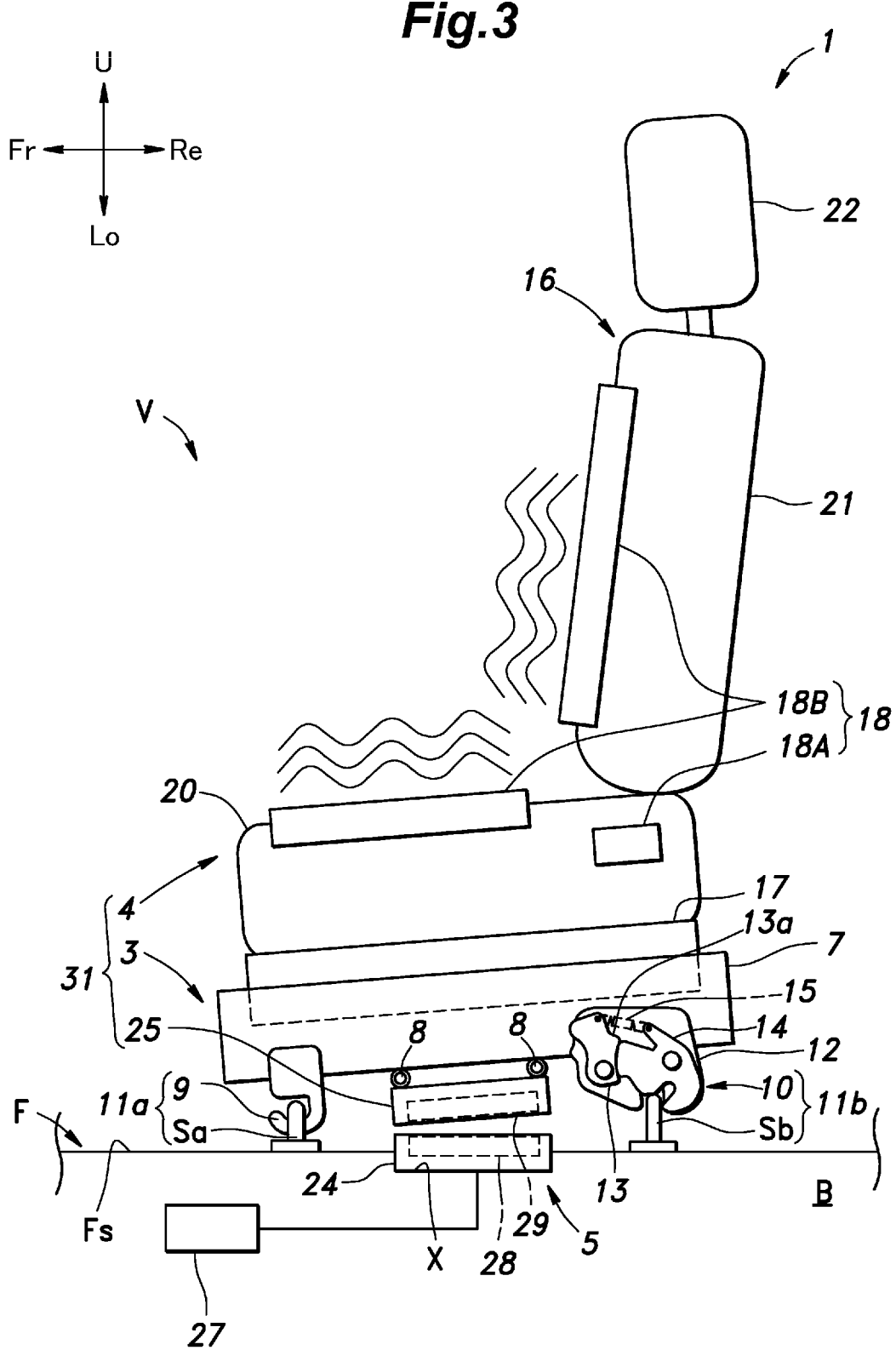
FIG. 3 is a side view showing a state where a seat unit is being attached to a floor of the vehicle in the seat device for the vehicle according to the first embodiment of the present invention.

The support member 3, the occupant seat 4, and the power receiving unit 25 are integrated as a seat unit 31. When the seat unit 31 is attached to the floor F, as shown in FIG. 3, a user such as an occupant engages each hook 9 with each front striker Sa, and engages the hook plate 14 of each lock mechanism 10 with each rear striker Sb. Next, the user pushes down the rear of the seat unit 31. Thereby, each rear striker Sb presses the hook plate 14 of each lock mechanism 10. Therefore, as shown in FIG. 1, the hook plate 14 of each lock mechanism 10 rotates from the unlock position to the lock position against a biasing force of the biasing member 15, and engages with the lock groove 13a of the lock plate 13 of each lock mechanism 10. Thereby, the hook plate 14 of each lock mechanism 10 is held at the lock position. Thus, the attachment of the seat unit 31 to the floor F is completed.

When the seat unit 31 is detached from the floor F, the user operates an operation member (not shown) mechanically or electrically connected to each lock mechanism 10. Thereby, the engagement of the hook plate 14 of each lock mechanism 10 with the lock groove 13a of the lock plate 13 of each lock mechanism 10 is released. Thereby, as shown in FIG. 3, the hook plate 14 of each lock mechanism 10 rotates from the lock position to the unlock position by the biasing force of the biasing member 15. Next, the user releases the engagement of the hook plate 14 of each lock mechanism 10 and each rear striker Sb, and also releases the engagement of each hook 9 and each front striker Sa. Thus, the detachment of the seat unit 31 from the floor F is completed.

As described above, in the present embodiment, the seat unit 31 is attached to and detached from the floor F by using each attachment/detachment mechanism 11a and 11b. Thus, the user can attach/detach the seat unit 31 to/from the floor F without using a tool such as a screwdriver.

(A Method for Adjusting the Position of the Occupant Seat 4 in the Fore and Aft Direction)

Figure 4:
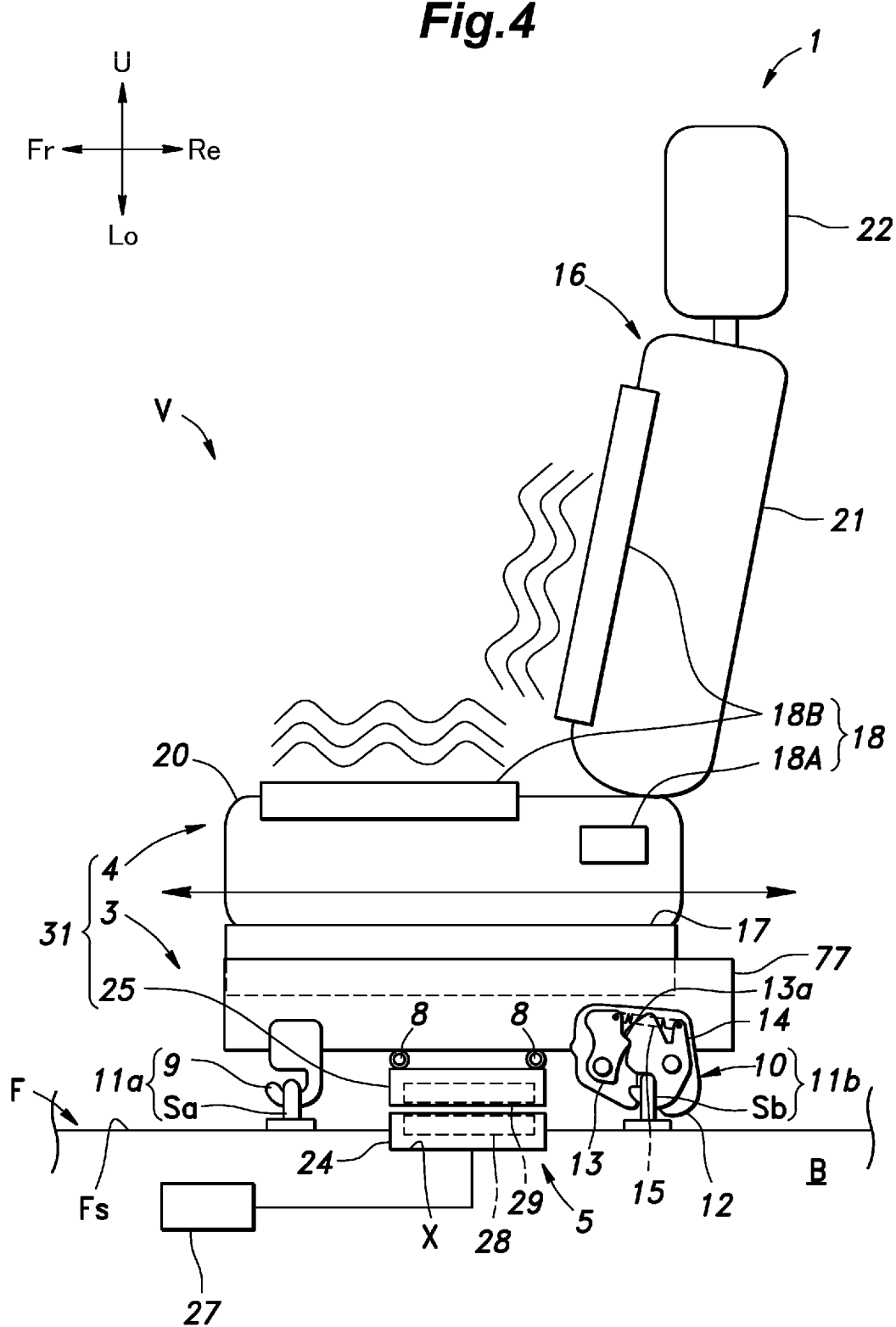
FIG. 4 is a side view showing a state where the occupant seat is slid forward in the seat device for the vehicle according to the first embodiment of the present invention.

In a case where the position of the occupant seat 4 in the fore and aft direction is adjusted manually, the user pushes the occupant seat 4 forward or backward. Thereby, the occupant seat 4 slides forward or backward with respect to the floor F as shown in FIG. 4.

On the other hand, when the position of the occupant seat 4 in the fore and aft direction is adjusted automatically, the user operates an operation panel (not shown) provided in the occupant seat 4 or the floor F. Thereby, the adjustment motor 18A drives the slide mechanism (not shown), and the slide mechanism slides the occupant seat 4 forward or backward with respect to the floor F, as shown in FIG. 4.

(Effects)

The vehicle V (specifically, a vehicle for autonomous driving) has various uses. Therefore, the arrangement of the occupant seat 4 needs to be changed flexibly by sliding, rotating, or tilting the occupant seat 4 with respect to the floor F. When the arrangement of the occupant seat 4 is changed in this way, the electric power needs to be reliably supplied to the electrical components 18 of the occupant seat 4. Further, in order to cope with a specific use of the vehicle V (for example, delivery of baggage), the occupant seat 4 needs to be detached from the floor F on demand to maximize the space in a vehicle cabin.

In the present embodiment, in the seat device 1 including the occupant seat 4 that is detachable from the floor F, the electric power is supplied to the electrical components 18 of the occupant seat 4 not by a wired power supply mechanism but by the wireless power supply mechanism 5. Therefore, it is possible to supply the electric power to the electrical components 18 of the occupant seat 4 without directly connecting the floor harness connected to the power supply device 27 of the vehicle V and the wire harnesses connected to the electrical components 18 of the occupant seat 4. Therefore, it is not necessary to connect the floor harness and the wire harnesses after attaching the seat unit 31 to the floor F and to disconnect the floor harness and the wire harnesses before detaching the seat unit 31 from the floor F. That is, the occupant seat 4 provided with the electrical components 18 can be easily attached to and detached from the floor F.

Also, by supplying the electric power to the electrical components 18 of the occupant seat 4 by the wireless power supply mechanism 5, the number of the wire harnesses required to supply the electric power to the electrical components 18 of the occupant seat 4 can be reduced, compared to a case where the electric power is supplied to the electrical components 18 of the occupant seat 4 by the wired power supply mechanism. Accordingly, the cost required for installing the wire harnesses can be reduced. Further, the number of the electrical components 18 provided in the occupant seat 4 can be increased, and the electrical components 18 can be arranged in a place where it is difficult to arrange a wire harness.

In order to supply the electric power to the electrical components 18 of the occupant seat 4 that is detachable from the floor F, a battery may be provided inside the occupant seat 4. However, the performance and life of the battery provided inside the occupant seat 4 are easily affected by the temperature of the vehicle cabin. In the present embodiment, by using the wireless power supply mechanism 5, the electric power can be supplied to the electrical components 18 of the occupant seat 4 without providing the battery inside the occupant seat 4. Therefore, the electric power can be supplied to the electrical components 18 of the occupant seat 4 without causing problems about the performance and life of the battery.

Further, the power receiving unit 25 is not attached to the occupant seat 4, but attached to the support member 3 that slidably supports the occupant seat 4. Therefore, even if the occupant seat 4 slides with respect to the floor F, the power receiving unit 25 remains at a fixed position with respect to the power transmitting unit 24. That is, even if the occupant seat 4 slides with respect to the floor F, a relative positional relationship between the power transmitting unit 24 and the power receiving unit 25 does not change. Therefore, even if the occupant seat 4 slides with respect to the floor F, the electric power can be reliably transmitted from the power transmitting unit 24 to the power receiving unit 25.

In a case where the wireless power supply mechanism 5 supplies the electric power to the electrical components 18 of the occupant seat 4, the power transmitting unit 24 may be housed inside the floor F. However, when such a configuration is adopted, the design and layout of the floor F may be greatly restricted by the power transmitting unit 24. Further, the power transmitting unit 24 may be separated from the power receiving unit 25, and the transmission efficiency of the electric power from the power transmitting unit 24 to the power receiving unit 25 may be deteriorated. In the present embodiment, by installing the power transmitting unit 24 on the surface Fs of the floor F, the flexibility of the design and layout of the floor F can be enhanced, and the transmission efficiency of the electric power from the power transmitting unit 24 to the power receiving unit 25 can be improved.

In the present embodiment, the power receiving unit 25 is disposed right below the occupant seat 4. Thus, it is possible to prevent the occupant from accessing a transmission field and placing baggage therein. The above "transmission field" is a field for wirelessly transmitting the electric power from the power transmitting unit 24 to the power receiving unit 25. The transmission field may be a space covered by the power receiving unit 25 from above and by the power transmitting unit 24 from below. Alternatively, the transmission field may be a space between the power transmitting unit 24 and the power receiving unit 25. Alternatively, the transmission field may be any space within 2 inches of the power transmitting unit 24 and the power receiving unit 25. The transmission field may include a space radially extending from the space between the power transmitting unit 24 and the power receiving unit 25.

(Modifications)

Figure 5:
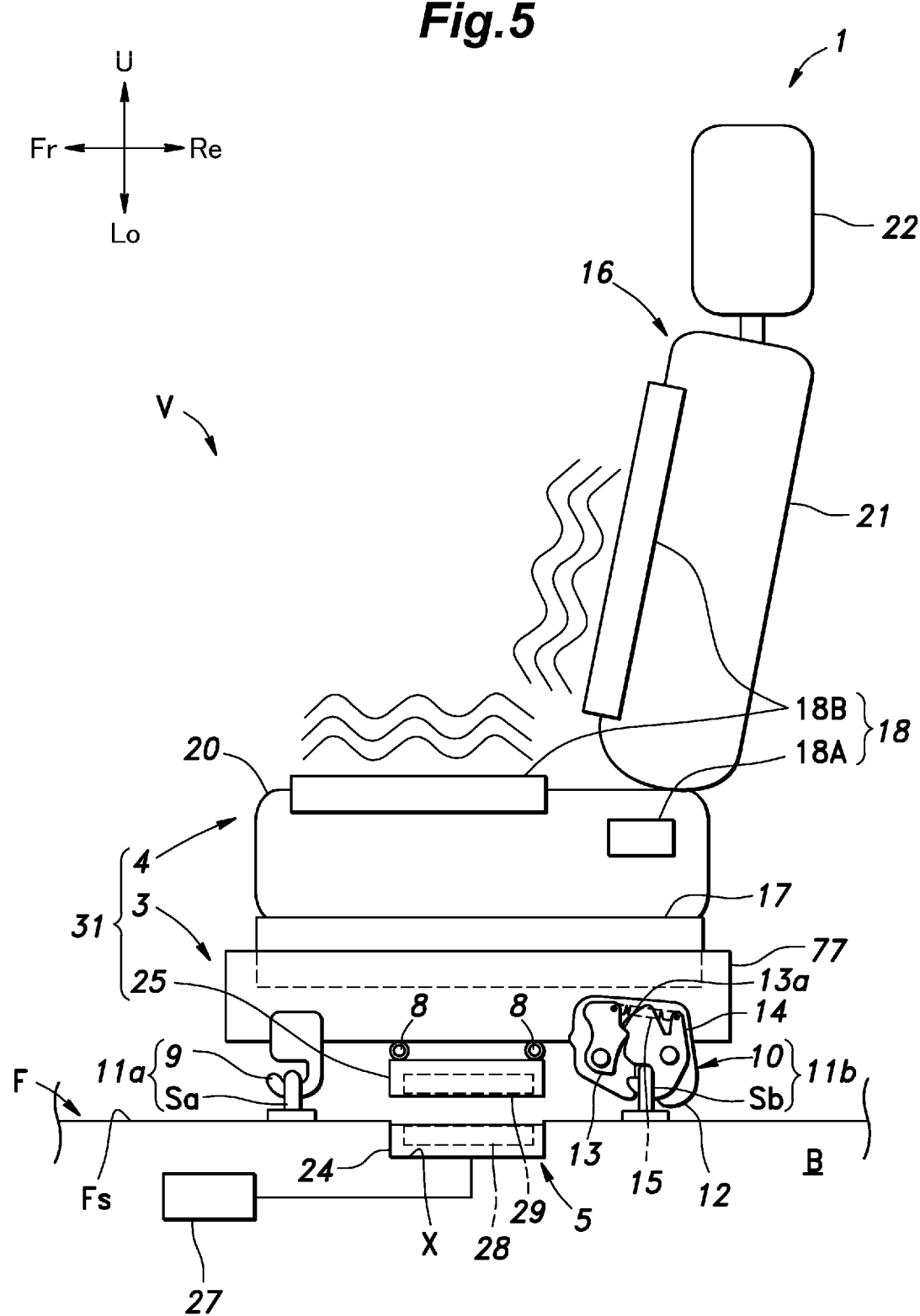
FIG. 5 is a side view showing a first modification of the seat device for the vehicle according to the first embodiment of the present invention.

In a first modification of the seat device 1 according to the first embodiment, as shown in FIG. 5, the entirety of the power transmitting unit 24 is housed in the recess X of the floor F. Therefore, the upper surface of the power transmitting unit 24 is located below the surface Fs of the floor F.

In a second modification of the seat device 1 according to the first embodiment, as shown in FIGS. 6A and 6B, the support member 3 supports the occupant seat 4 so that the occupant seat 4 can tilt. For example, as shown in FIG. 6A, the occupant seat 4 may tilt with respect to the floor F by raising and lowering a rear part of the occupant seat 4 with respect to a front part thereof by a tilt mechanism 34. Alternatively, as shown in FIG. 6B, the occupant seat 4 may tilt with respect to the floor F by raising and lowering the front part of the occupant seat 4 with respect to the rear part thereof by the tilt mechanism 34. The tilt mechanism 34 includes, for example, a pinion gear connected to the adjustment motor 18A and a sector gear that meshes with the pinion gear. When the pinion gear is rotated by a driving force of the adjustment motor 18A, the sector gear rotates upward or downward, and the front or rear part of the occupant seat 4 connected to the sector gear moves upward or downward.

Figure 7:
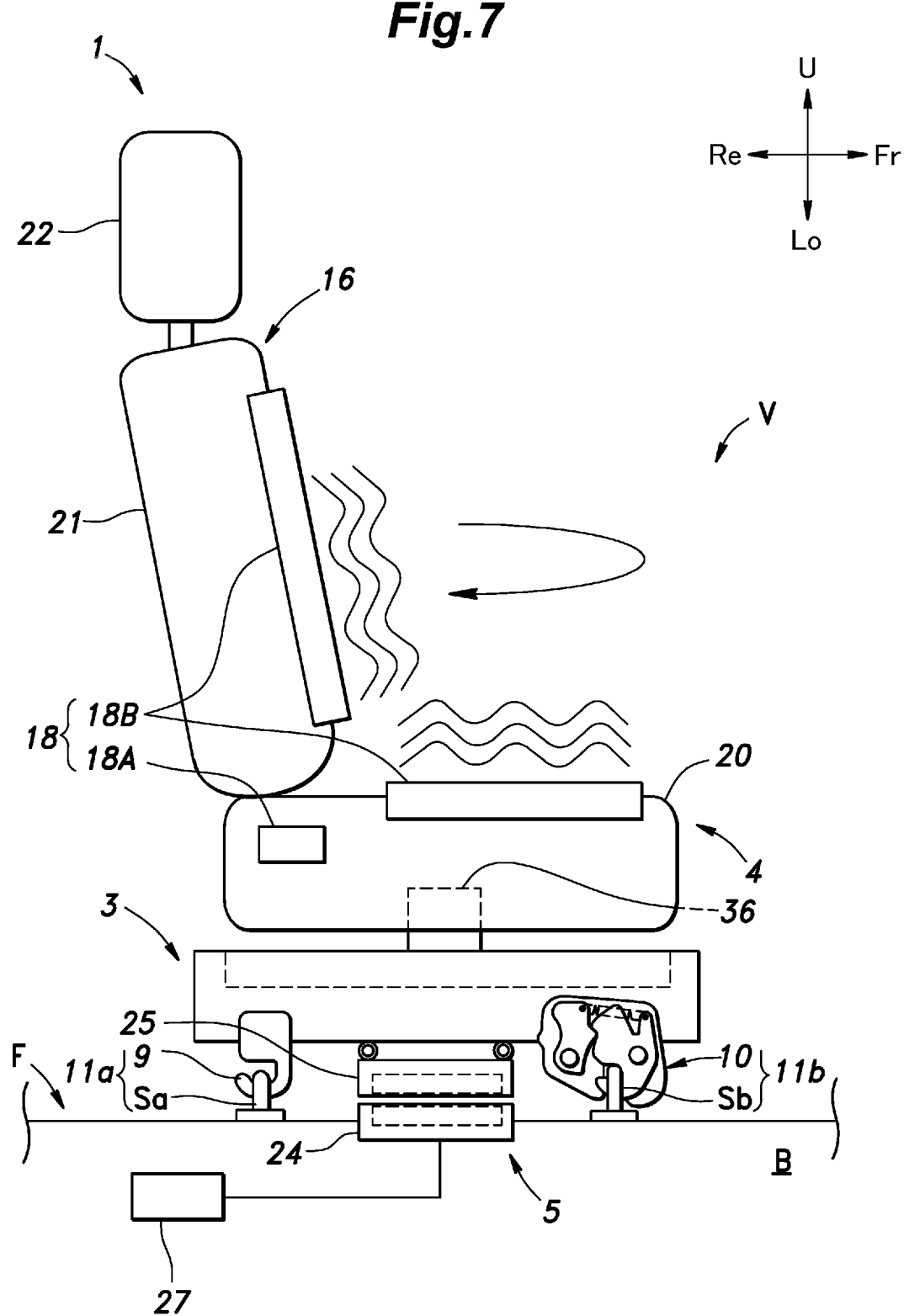
FIG. 7 is a side view showing a third modification of the seat device for the vehicle according to the first embodiment of the present invention.

In a third modification of the seat device 1 according to the first embodiment, as shown in FIG. 7, the support member 3 rotatably supports the occupant seat 4 via a rotation axis 36. For example, by rotating the occupant seat 4 with respect to the support member 3 by a driving force of the adjustment motor 18A, the occupant seat 4 rotates with respect to the floor F.

Figure 8:
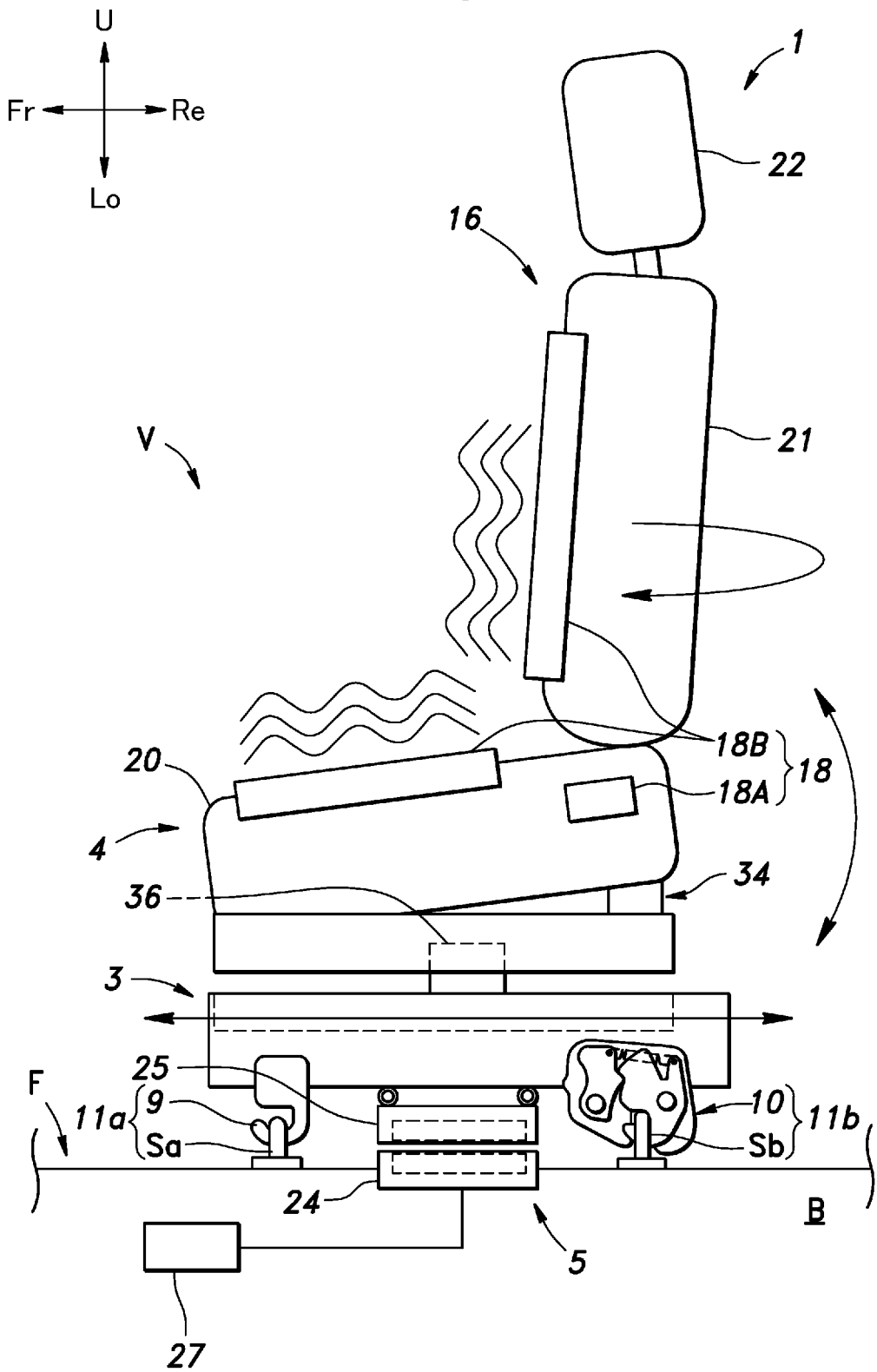
FIG. 8 is a side view showing a fourth modification of the seat device for the vehicle according to the first embodiment of the present invention.

In a fourth modification of the seat device 1 according to the first embodiment, as shown in FIG. 8, the support member 3 supports the occupant seat 4 so that the occupant seat 4 can slide in the fore and aft direction, tilt, and rotate. For example, by sliding, tilting, or rotating the occupant seat 4 with respect to the support member 3 by one or more adjustment motors 18A, the occupant seat 4 slides in the fore and aft direction, tilts, or rotates with respect to the floor F.

Second Embodiment

In the following, a seat device 41 for a vehicle V (hereinafter simply referred to as "seat device 41") according to a second embodiment of the present invention will be described with reference to FIGS. 9 to 11. Descriptions that may overlap with those of the first embodiment will be omitted.

(Configuration of the Seat Device 41)

Figure 9:
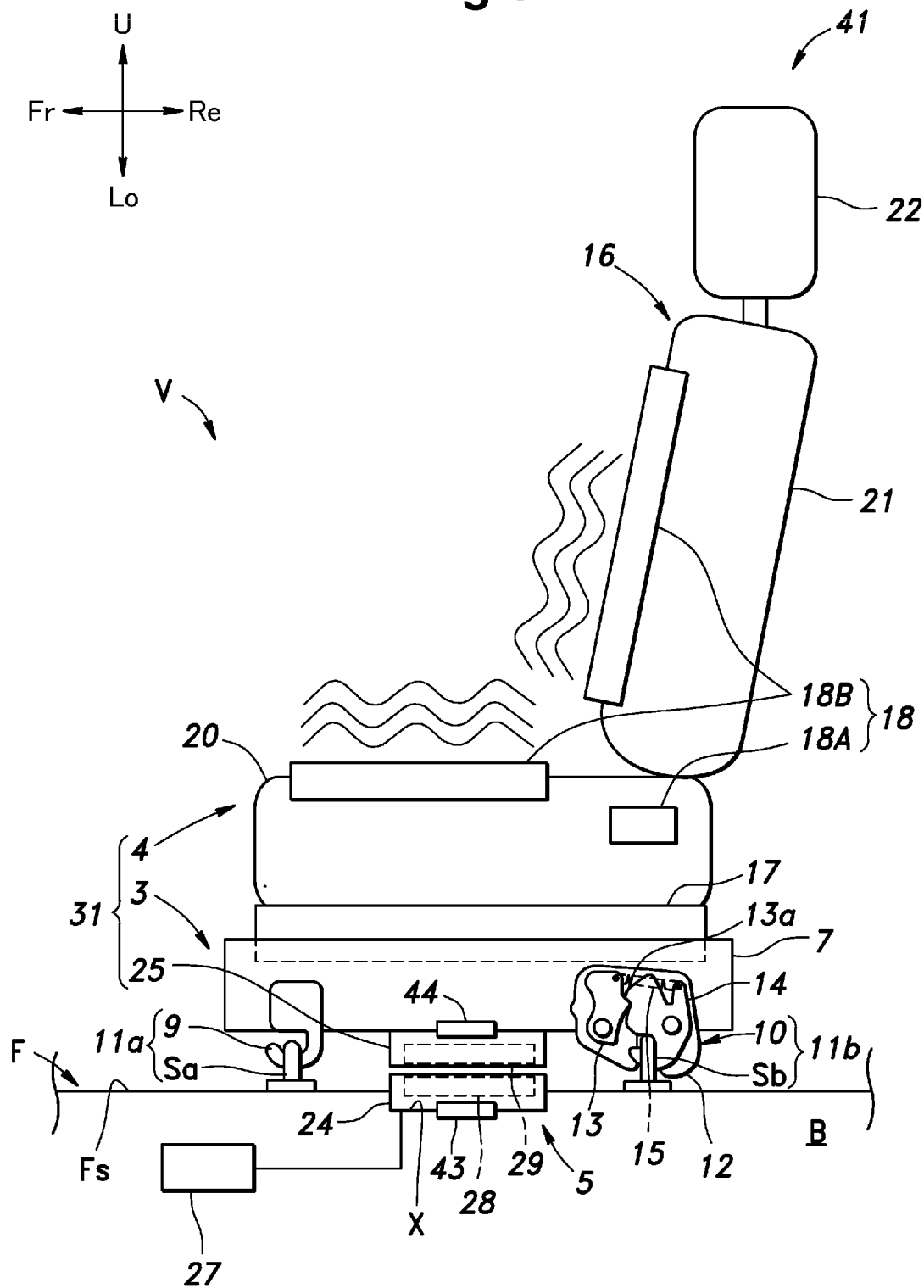
FIG. 9 is a side view showing a seat device for a vehicle according to a second embodiment of the present invention.

As shown in FIG. 9, the seat device 41 according to the second embodiment includes a lower heat transfer member 43 and an upper heat transfer member 44 in addition to the components of the seat device 1 according to the first embodiment.

The lower heat transfer member 43 is disposed between the floor F and the power transmitting unit 24, and abuts against the floor F and the power transmitting unit 24. A central part in the fore and aft direction of the power transmitting unit 24 is connected to the floor F via the lower heat transfer member 43. Front and rear parts of the power transmitting unit 24 abut against the floor F. The lower heat transfer member 43 is formed of a material having higher thermal conductivity than the power transmitting unit 24. The lower heat transfer member 43 may be, for example, a pillar or a fin, or may be a member other than the pillar and the fin.

The upper heat transfer member 44 is disposed between the support member 3 and the power receiving unit 25, and abuts against the support member 3 and the power receiving unit 25. A central part in the fore and aft direction of the power receiving unit 25 is connected to the support member 3 via the upper heat transfer member 44. Front and rear parts of the power receiving unit 25 abut against the support member 3. The upper heat transfer member 44 is formed of a material having higher thermal conductivity than the power receiving unit 25. The upper heat transfer member 44 may be, for example, a pillar or a fin, or may be a member other than the pillar and the fin.

(Effects)

The power transmitting unit 24 and the power receiving unit 25 generate a large amount of heat when activated. If the heat generated by the power transmitting unit 24 and the power receiving unit 25 is not sufficiently removed from these units, the performance of the power transmitting unit 24 and the power receiving unit 25 may be affected.

In the present embodiment, the power transmitting unit 24 and the floor F are connected via the lower heat transfer member 43 having higher thermal conductivity than the power transmitting unit 24. Thereby, the lower heat transfer member 43 forms a heat passage from the power transmitting unit 24 to the floor F, and the heat of the power transmitting unit 24 can be released to the floor F via the lower heat transfer member 43. Therefore, the floor F having a lower temperature and a larger volume than the power transmitting unit 24 can be used as a heat sink of the power transmitting unit 24, and the temperature of the power transmitting unit 24 can be prevented from rising.

In the present embodiment, the power receiving unit 25 and the support member 3 are connected via the upper heat transfer member 44 having higher thermal conductivity than the power receiving unit 25. Thereby, the upper heat transfer member 44 forms a heat passage from the power receiving unit 25 to the support member 3, and the heat of the power receiving unit 25 can be released to the support member 3 via the upper heat transfer member 44. Therefore, the support member 3 having a lower temperature and a larger volume than the power receiving unit 25 can be used as a heat sink of the power receiving unit 25, and the temperature of the power receiving unit 25 can be prevented from rising.

In order to prevent the temperatures of the power transmitting unit 24 and the power receiving unit 25 from rising, the power transmitting unit 24 and the power receiving unit 25 may be cooled down by an active cooling system including a fan. However, the active cooling system generates noise when the fan is operated, and requires additional electric power and cost to operate the fan. In the present embodiment, by using a passive cooling system constituted by the lower heat transfer member 43 and the upper heat transfer member 44, the power transmitting unit 24 and the power receiving unit 25 can be cooled without generating noise and increasing the electric power and cost.

(Modifications)

Figure 10:
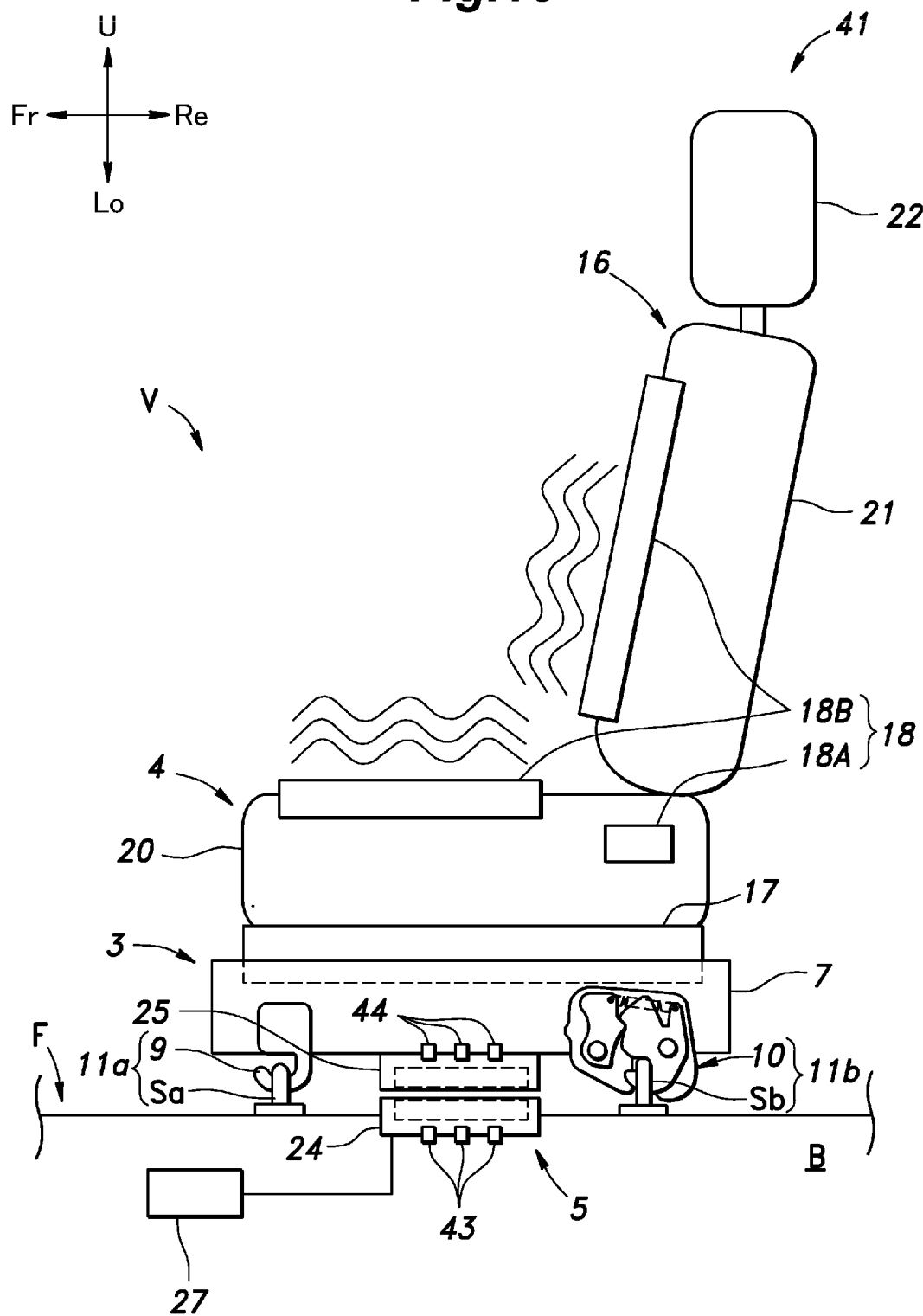
FIG. 10 is a side view showing a first modification of the seat device for the vehicle according to the second embodiment of the present invention.

In a first modification of the seat device 41 according to the second embodiment, as shown in FIG. 10, the power transmitting unit 24 and the floor F are connected via a plurality of lower heat transfer members 43 provided at intervals in the fore and aft direction. In other embodiments, the plurality of lower heat transfer members 43 may be provided at intervals in the lateral direction. Further, the power receiving unit 25 and the support member 3 are connected via a plurality of upper heat transfer members 44 provided at intervals in the fore and aft direction. In other embodiments, the plurality of upper heat transfer members 44 may be provided at intervals in the lateral direction.

Figure 11:
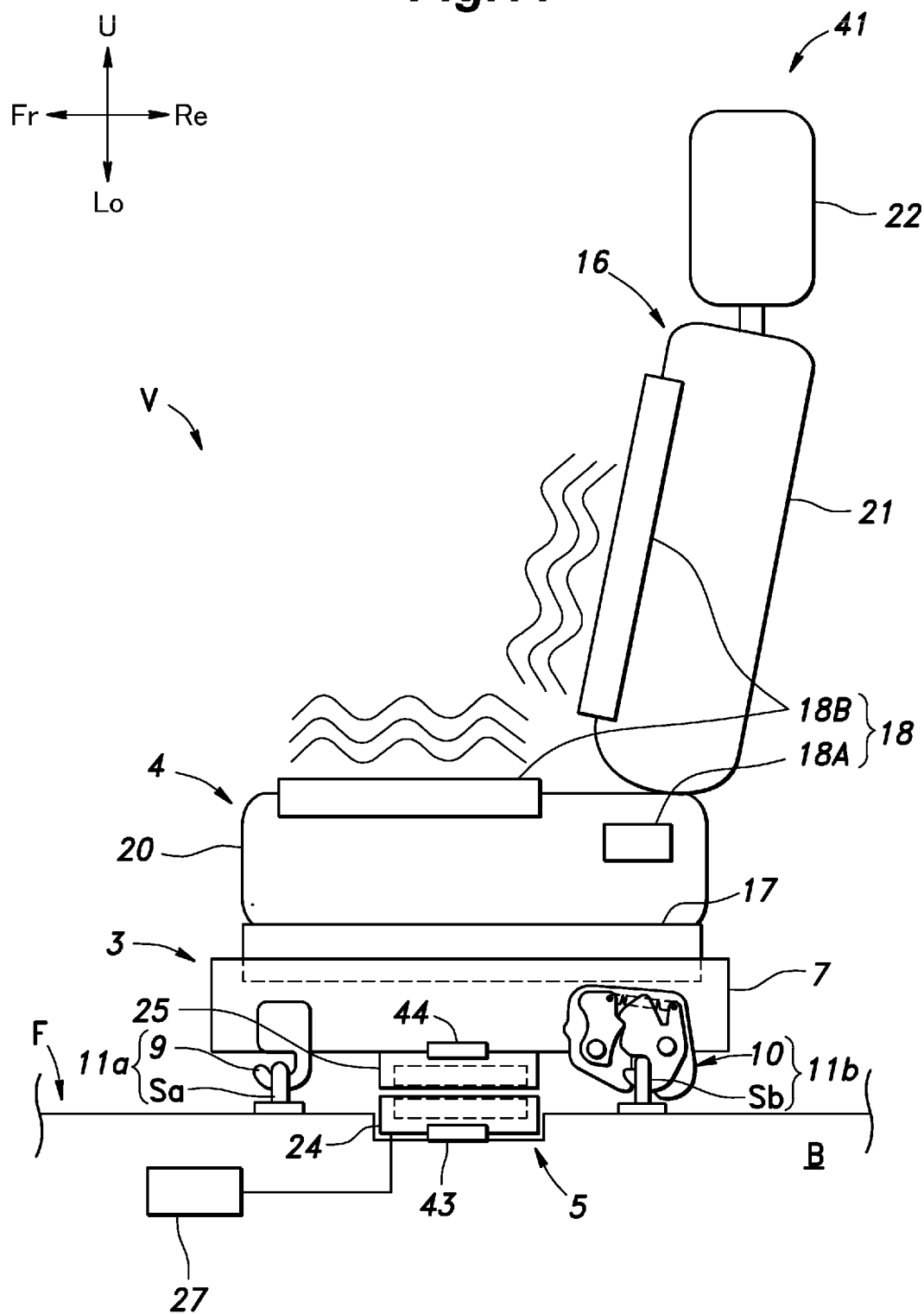
FIG. 11 is a side view showing a second modification of the seat device for the vehicle according to the second embodiment of the present invention.

In a second modification of the seat device 41 according to the second embodiment, as shown in FIG. 11, the lower heat transfer member 43 supports the power transmitting unit 24 at a position spaced from the floor F. Thereby, the power transmitting unit 24 does not abut against the floor F.

Third Embodiment

In the following, an electrical device 51 for a vehicle V (hereinafter simply referred to as "electrical device 51") according to a third embodiment of the present invention will be described with reference to FIGS. 12 to 14. Descriptions that may overlap with those of the first embodiment will be omitted.

(Configuration of the Electrical Device 51)

Figure 12:
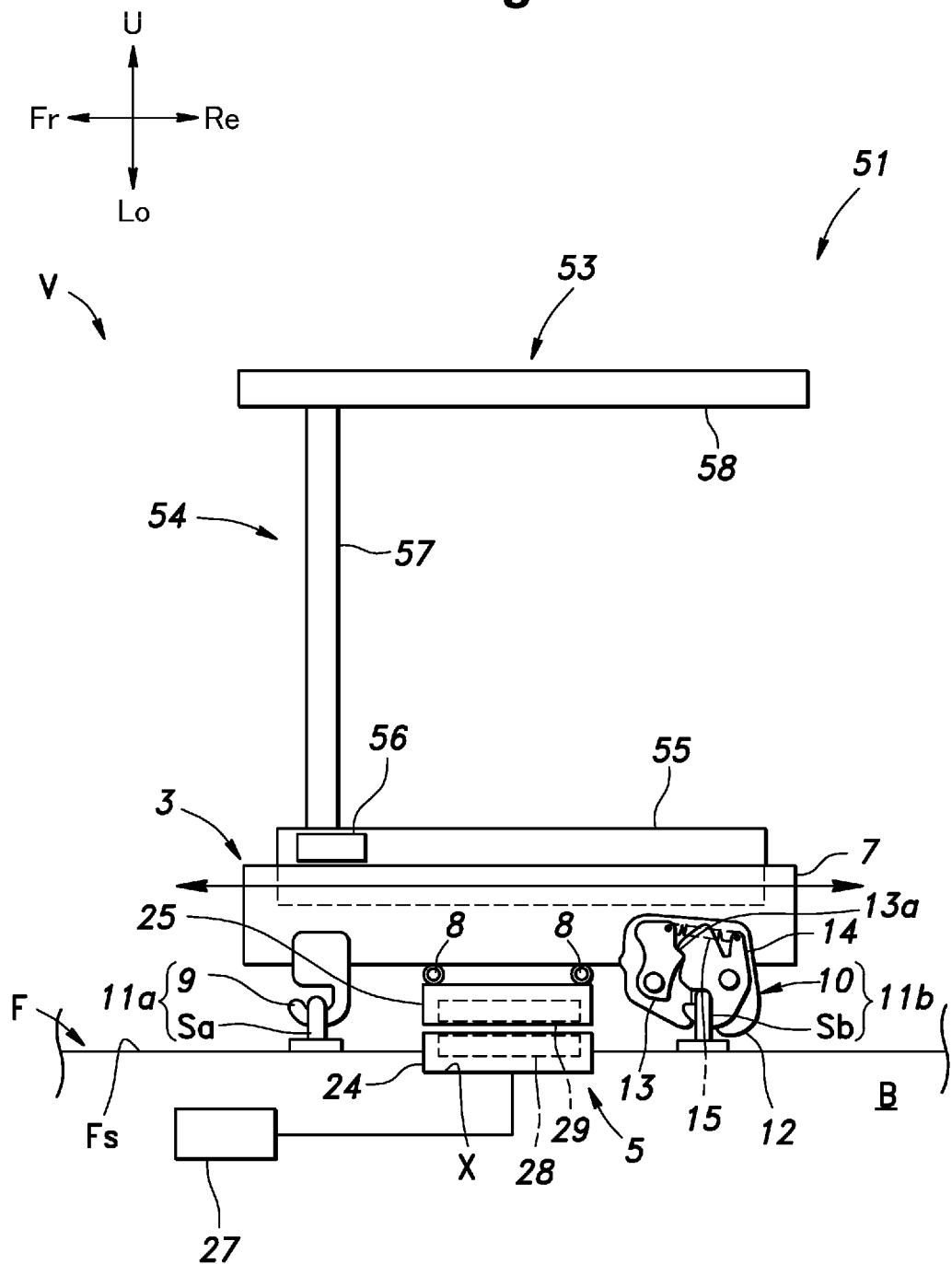
FIG. 12 is a side view showing an electrical device for a vehicle according to a third embodiment of the present invention.

As shown in FIG. 12, the electrical device 51 according to the third embodiment includes an electrical equipment 53, instead of the occupant seat 4 of the seat device 1 according to the first embodiment. The electrical equipment 53 includes, for example, an equipment body 54 and a pair of left and right upper rails 55 attached to a lower end of the equipment body 54.

The equipment body 54 of the electrical equipment 53 includes, for example, a support body 57 extending vertically and a table 58 supported by the support body 57 so as to move up and down. The table 58 is connected to a driving motor 56 and moves up and down by a driving force of the driving motor 56. The driving motor 56 is connected to the power receiving unit 25 of the wireless power supply mechanism 5 via the wire harness (not shown), and generates the driving force by the electric power supplied from the power receiving unit 25.

Each upper rail 55 of the electrical equipment 53 extends in the fore and aft direction. Each upper rail 55 engages with the engagement groove (not shown) of each lower rail 7 of the support member 3. Thus, the support member 3 supports the electrical equipment 53 slidably in the fore and aft direction.

(Effects)

In the present embodiment, the power receiving unit 25 is not attached to the electrical equipment 53, but attached to the support member 3 that slidably supports the electrical equipment 53. Therefore, even if the electrical equipment 53 slides with respect to the floor F, the power receiving unit 25 remains at a fixed position with respect to the power transmitting unit 24. That is, even if the electrical equipment 53 slides with respect to the floor F, a relative positional relationship between the power transmitting unit 24 and the power receiving unit 25 does not change. Therefore, even if the electrical equipment 53 slides with respect to the floor F, the electric power can be reliably transmitted from the power transmitting unit 24 to the power receiving unit 25.

(Modifications)

Figure 13:
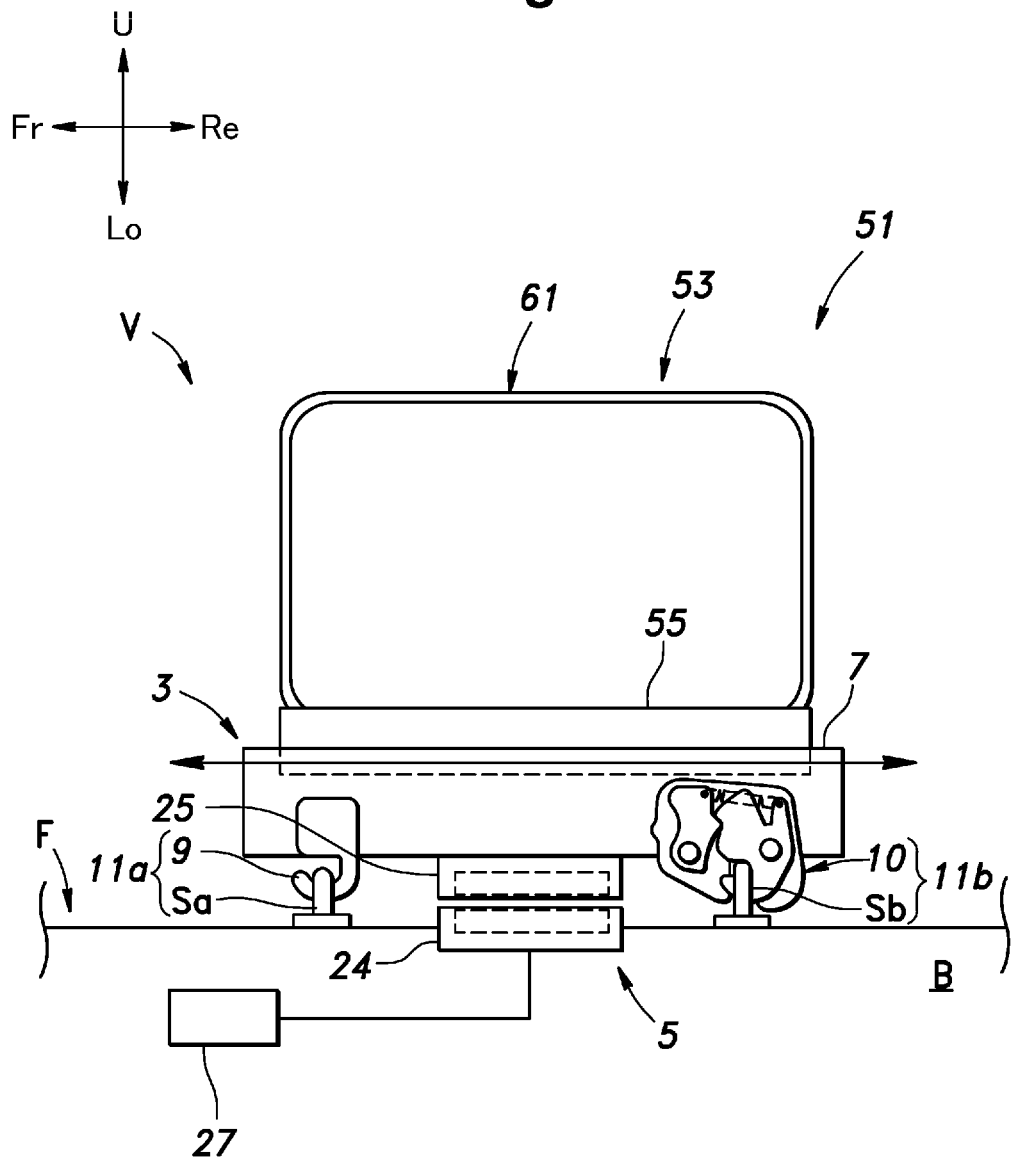
FIG. 13 is a side view showing a first modification of the electrical device for the vehicle according to the third embodiment of the present invention.

In a first modification of the electrical device 51 according to the third embodiment, as shown in FIG. 13, the electrical equipment 53 includes an electrical appliance 61 such as a cooling storage or a heating storage and the pair of left and right upper rails 55 attached to the electrical appliance 61. The electrical equipment 53 is detachable from the support member 3. Even when the electrical equipment 53 is detached from the support member 3 (even when the electrical equipment 53 is stowed away), the power receiving unit 25 remains at a fixed position with respect to the power transmitting unit 24.

Figure 14:
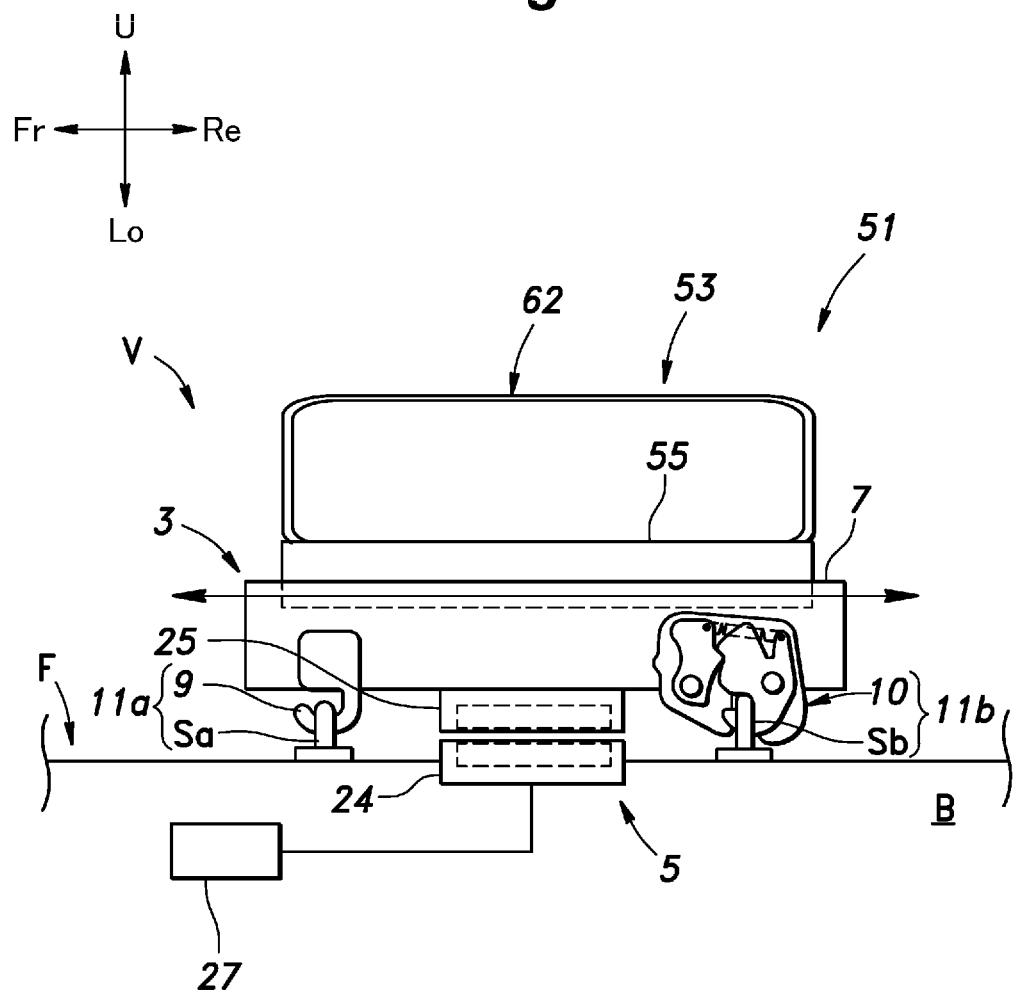
FIG. 14 is a side view showing a second modification of the electrical device for the vehicle according to the third embodiment of the present invention.

In a second modification of the electrical device 51 according to the third embodiment, as shown in FIG. 14, the electrical equipment 53 includes an electronic equipment 62 such as a power supply device, a charging device, or a speaker and the pair of left and right upper rails 55 attached to the electronic equipment 62. The electrical equipment 53 is detachable from the support member 3. Even when the electrical equipment 53 is detached from the support member 3 (even when the electrical equipment 53 is stowed away), the power receiving unit 25 remains at a fixed position with respect to the power transmitting unit 24.

Concrete embodiments of the present invention have been described in the foregoing, but the present invention should not be limited by the foregoing embodiments and various modifications and alterations are possible within the scope of the present invention.

The invention claimed is:

1. A seat device for a vehicle, comprising:
   a support member detachably attached to a floor of the vehicle;

an occupant seat movably supported by the support member and provided with at least one electrical component; and
a wireless power supply mechanism configured to supply electric power to the electrical component and including
a power transmitting unit attached to the floor, and
a power receiving unit attached to the support member so as to face the power transmitting unit and configured to receive the electric power wirelessly from the power transmitting unit,
wherein the support member is configured to
support the occupant seat so that the occupant seat can slide in a fore and aft direction, and
rotatably support the occupant seat via a rotation axis extending vertically so that the occupant seat can rotate horizontally.

2. The seat device according to claim 1, wherein the support member is attached to the floor via at least one attachment member protruding from a surface of the floor, and
an upper surface of the power transmitting unit is located lower than an upper surface of the at least one attachment member.

3. The seat device according to claim 1, wherein an upper surface of the power transmitting unit is located lower than a surface of the floor.

4. The seat device according to claim 1, wherein the power transmitting unit and the power receiving unit are configured such that a relative positional relationship therebetween does not change even when the occupant seat moves.

5. The seat device according to claim 1, wherein the support member includes a pair of left and right lower rails, and
the occupant seat includes a pair of left and right upper rails slidably engaged with the pair of left and right lower rails.

6. The seat device according to claim 5, wherein the support member further includes a cross member extending between the pair of left and right lower rails, and
the power receiving unit is attached to the cross member.

7. The seat device according to claim 1, wherein the support member is attached to the floor via a pair of front and rear attachment members, and
in a side view of the vehicle, the power transmitting unit is located between the pair of front and rear attachment members.

8. The seat device according to claim 1, wherein the power transmitting unit and the floor are connected via a member having higher thermal conductivity than the power transmitting unit.

9. The seat device according to claim 1, wherein the power receiving unit and the support member are connected via a member having higher thermal conductivity than the power receiving unit.

10. A seat device for a vehicle, comprising:
a support member attached to a floor of the vehicle;
an occupant seat movably supported by the support member and provided with at least one electrical component; and
a wireless power supply mechanism configured to supply electric power to the electrical component and including
a power transmitting unit attached to the floor, and
a power receiving unit attached to the support member so as to face the power transmitting unit and configured to receive the electric power wirelessly from the power transmitting unit,
wherein the support member is configured to
support the occupant seat so that the occupant seat can slide in a fore and aft direction, and
rotatably support the occupant seat via a rotation axis extending vertically so that the occupant seat can rotate horizontally.

11. The seat device according to claim 1, wherein the occupant seat includes a seat body that includes:
a seat cushion on which an occupant sits;
a seat back extending upward from a rear end of the seat cushion; and
a headrest extending upward from an upper end of the seat back.

12. The seat device according to claim 11, wherein the at least one electrical component comprises a plurality of electrical components attached to the seat body,
the plurality of electrical components includes:
an adjustment motor for sliding the occupant seat in the fore and aft direction; and
a plurality of heaters for heating the seat body, and
the plurality of heaters is attached to an upper surface of the seat cushion and a front surface of the seat back, respectively.

13. The seat device according to claim 10, wherein the occupant seat includes a seat body that includes:
a seat cushion on which an occupant sits;
a seat back extending upward from a rear end of the seat cushion; and
a headrest extending upward from an upper end of the seat back.

14. The seat device according to claim 13, wherein the at least one electrical component comprises a plurality of electrical components attached to the seat body,
the plurality of electrical components includes:
an adjustment motor for sliding the occupant seat in the fore and aft direction; and
a plurality of heaters for heating the seat body, and
the plurality of heaters is attached to an upper surface of the seat cushion and a front surface of the seat back, respectively.

15. A manufacturing method of the seat device according to claim 1.

16. A manufacturing method of the seat device according to claim 10.

* * * * *